(12) United States Patent
Griffin

(10) Patent No.: US 6,394,737 B1
(45) Date of Patent: May 28, 2002

(54) INTERCHANGEABLE ATTACHMENT ASSEMBLY FOR A LAWN TRACTOR

(76) Inventor: Orliff D. Griffin, 138 Edgewood Rd., Radcliff, KY (US) 40160

( * ) Notice: Subject to any disclaimer, the term of this patent is extended or adjusted under 35 U.S.C. 154(b) by 9 days.

(21) Appl. No.: 09/612,430

(22) Filed: Jul. 7, 2000

(51) Int. Cl.[7] .................................................. B66F 9/12
(52) U.S. Cl. ......................................... 414/607; 172/817
(58) Field of Search ........................... 414/607; 172/817

(56) References Cited

U.S. PATENT DOCUMENTS

| | | | | |
|---|---|---|---|---|
| 4,773,666 A | * | 9/1988 | Koberlein et al. | 280/460 A |
| 5,082,065 A | * | 1/1992 | Fletcher | 172/273 |
| 5,411,102 A | * | 5/1995 | Nickels et al. | 172/781 |
| 5,497,569 A | * | 3/1996 | Byman | 414/607 X |
| 5,699,863 A | * | 12/1997 | Figura | 172/145 |

FOREIGN PATENT DOCUMENTS

DE            2911228       * 10/1980  ................. 414/607

* cited by examiner

*Primary Examiner*—Steven A. Bratlie

(57) ABSTRACT

An interchangeable attachment assembly for a lawn tractor for making a lawn tractor more versatile so that it can be used for to do many tasks. The interchangeable attachment assembly for a lawn tractor includes a base assembly being adapted to mount to the lawn tractor; and also includes a lift assembly for lifting task-performing attachments with the lift assembly being mounted to the base assembly; and further includes task-performing attachment assembly for performing various tasks and being mounted to the lift assembly.

19 Claims, 4 Drawing Sheets

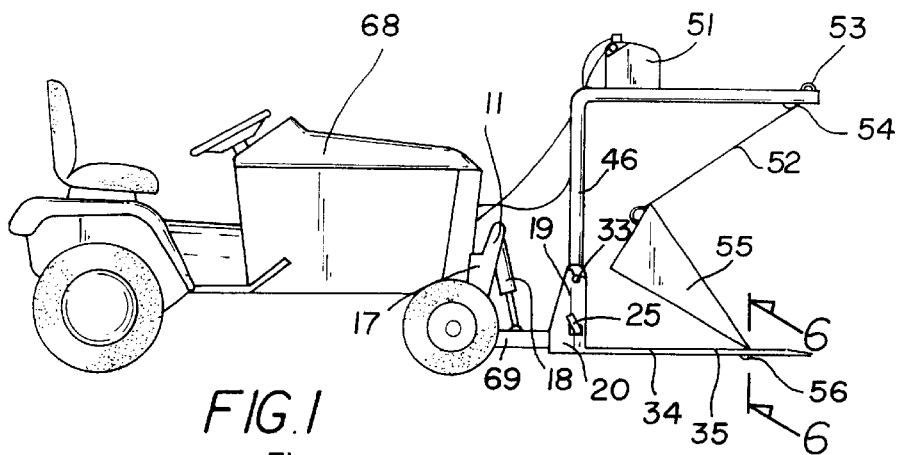
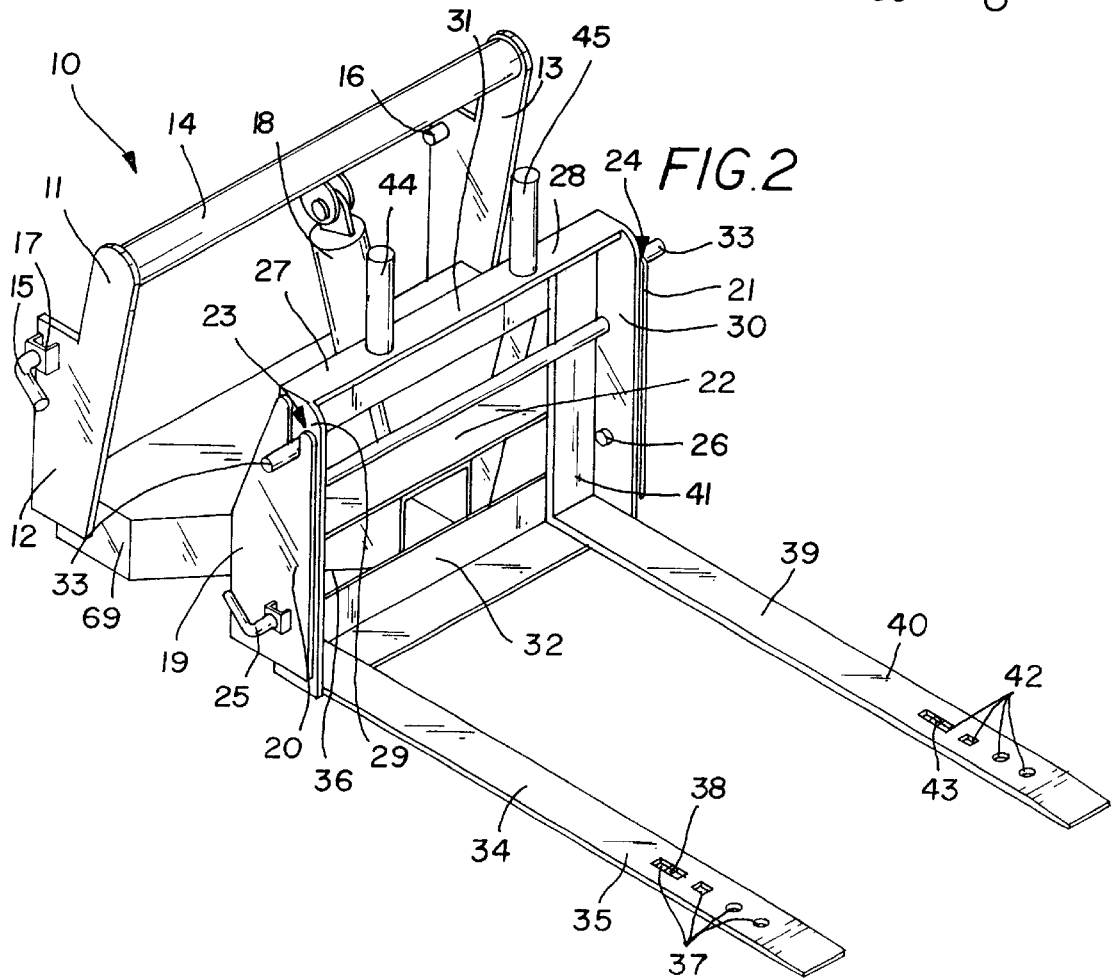

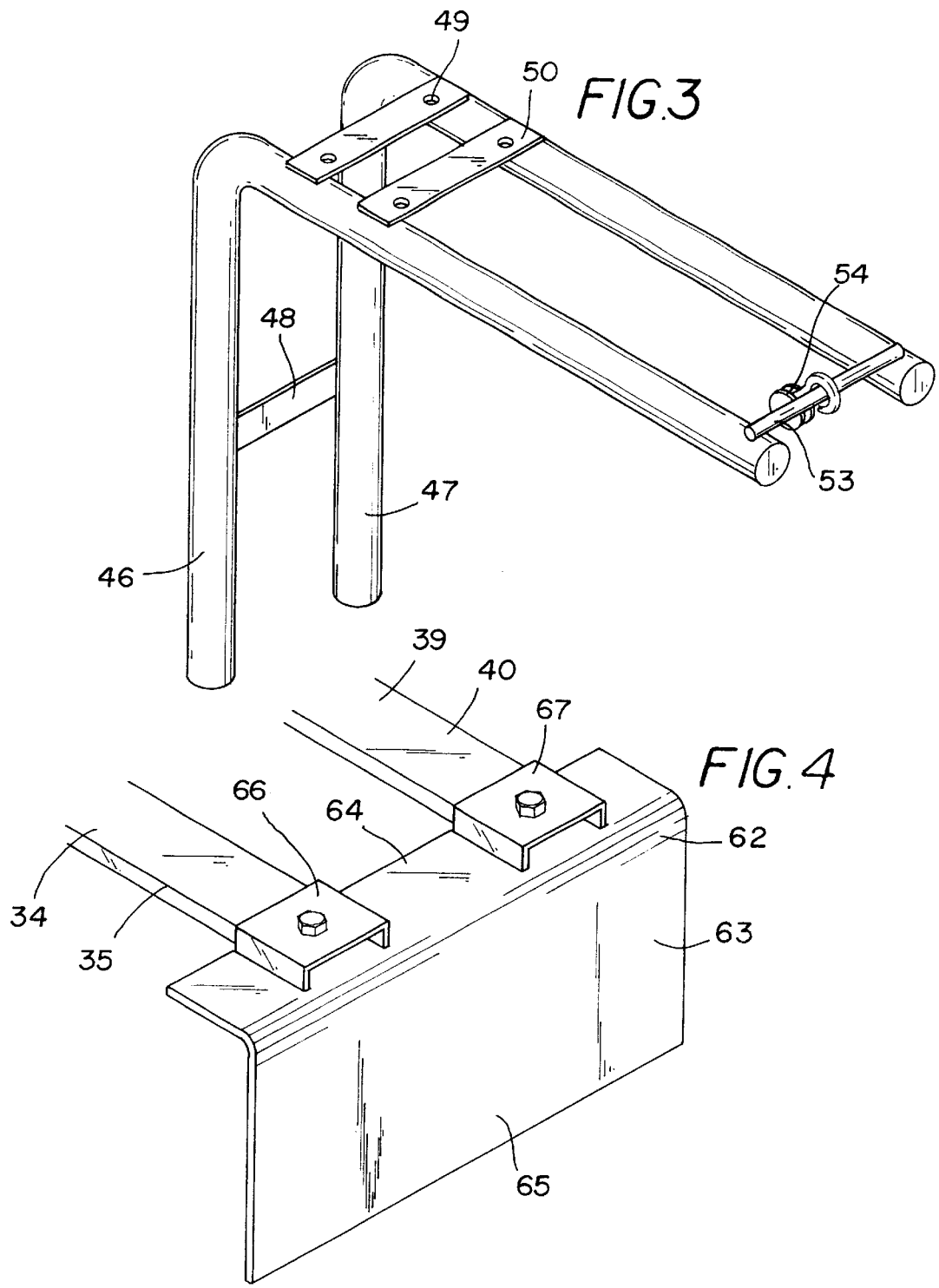

INTERCHANGEABLE ATTACHMENT ASSEMBLY FOR A LAWN TRACTOR

BACKGROUND OF THE INVENTION

1. Field of the Invention

The present invention relates to a lawn tractor attachment assembly and more particularly pertains to a new interchangeable attachment assembly for a lawn tractor for making a lawn tractor more versatile so that it can be used for to do many tasks.

2. Description of the Prior Art

The use of a lawn tractor attachment assembly is known in the prior art. More specifically, a lawn tractor attachment assembly heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,394,107; 4,103,796; 3,319,367; 3,646,736; 3,966,070; and U.S. Pat. No. Des. 243,326.

While these devices fulfill their respective, particular objectives and requirements, the aforementioned patents do not disclose a new interchangeable attachment assembly for a lawn tractor. The inventive device includes a base assembly being adapted to mount to the lawn tractor; and also includes a lift assembly for lifting task-performing attachments with the lift assembly being mounted to the base assembly; and further includes task-performing attachment assembly for performing various tasks and being mounted to the lift assembly.

In these respects, the interchangeable attachment assembly for a lawn tractor according to the present invention substantially departs from the conventional concepts and designs of the prior art, and in so doing provides an apparatus primarily developed for the purpose of making a lawn tractor more versatile so that it can be used for to do many tasks.

SUMMARY OF THE INVENTION

In view of the foregoing disadvantages inherent in the known types of lawn tractor attachment assembly now present in the prior art, the present invention provides a new interchangeable attachment assembly for a lawn tractor construction wherein the same can be utilized for making a lawn tractor more versatile so that it can be used for to do many tasks.

The general purpose of the present invention, which will be described subsequently in greater detail, is to provide a new interchangeable attachment assembly for a lawn tractor which has many of the advantages of the lawn tractor attachment assembly mentioned heretofore and many novel features that result in a new interchangeable attachment assembly for a lawn tractor which is not anticipated, rendered obvious, suggested, or even implied by any of the prior art lawn tractor attachment assembly, either alone or in any combination thereof.

To attain this, the present invention generally comprises a base assembly being adapted to mount to the lawn tractor; and also includes a lift assembly for lifting task-performing attachments with the lift assembly being mounted to the base assembly; and further includes task-performing attachment assembly for performing various tasks and being mounted to the lift assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new interchangeable attachment assembly for a lawn tractor which has many of the advantages of the lawn tractor attachment assembly mentioned heretofore and many novel features that result in a new interchangeable attachment assembly for a lawn tractor which is not anticipated, rendered obvious, suggested, or even implied by any of the prior art lawn tractor attachment assembly, either alone or in any combination thereof.

It is another object of the present invention to provide a new interchangeable attachment assembly for a lawn tractor which may be easily and efficiently manufactured and marketed.

It is a further object of the present invention to provide a new interchangeable attachment assembly for a lawn tractor which is of a durable and reliable construction.

An even further object of the present invention is to provide a new interchangeable attachment assembly for a lawn tractor which is susceptible of a low cost of manufacture with regard to both materials and labor, and which accordingly is then susceptible of low prices of sale to the consuming public, thereby making such interchangeable attachment assembly for a lawn tractor economically available to the buying public.

Still yet another object of the present invention is to provide a new interchangeable attachment assembly for a lawn tractor which provides in the apparatuses and methods of the prior art some of the advantages thereof, while simultaneously overcoming some of the disadvantages normally associated therewith.

Still another object of the present invention is to provide a new interchangeable attachment assembly for a lawn tractor for making a lawn tractor more versatile so that it can be used for to do many tasks.

Yet another object of the present invention is to provide a new interchangeable attachment assembly for a lawn tractor which includes a base assembly being adapted to mount to the lawn tractor; and also includes a lift assembly for lifting task-performing attachments with the lift assembly being mounted to the base assembly; and further includes task-performing attachment assembly for performing various tasks and being mounted to the lift assembly.

Still yet another object of the present invention is to provide a new interchangeable attachment assembly for a lawn tractor that is easy and convenient to mount to a lawn tractor for performing various tasks.

Even still another object of the present invention is to provide a new interchangeable attachment assembly for a lawn tractor that eliminates the user from having to purchase or rent separate equipment for doing the need tasks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a first embodiment of a new interchangeable attachment assembly for a lawn tractor according to the present invention.

FIG. 2 is a perspective view of the present invention.

FIG. 3 is a perspective view of the winch support members of the first embodiment of the present invention.

FIG. 4 is a perspective view of a scraper member of a third embodiment of the present invention.

DESCRIPTION OF THE PREFERRED EMBODIMENT

Figure 5:
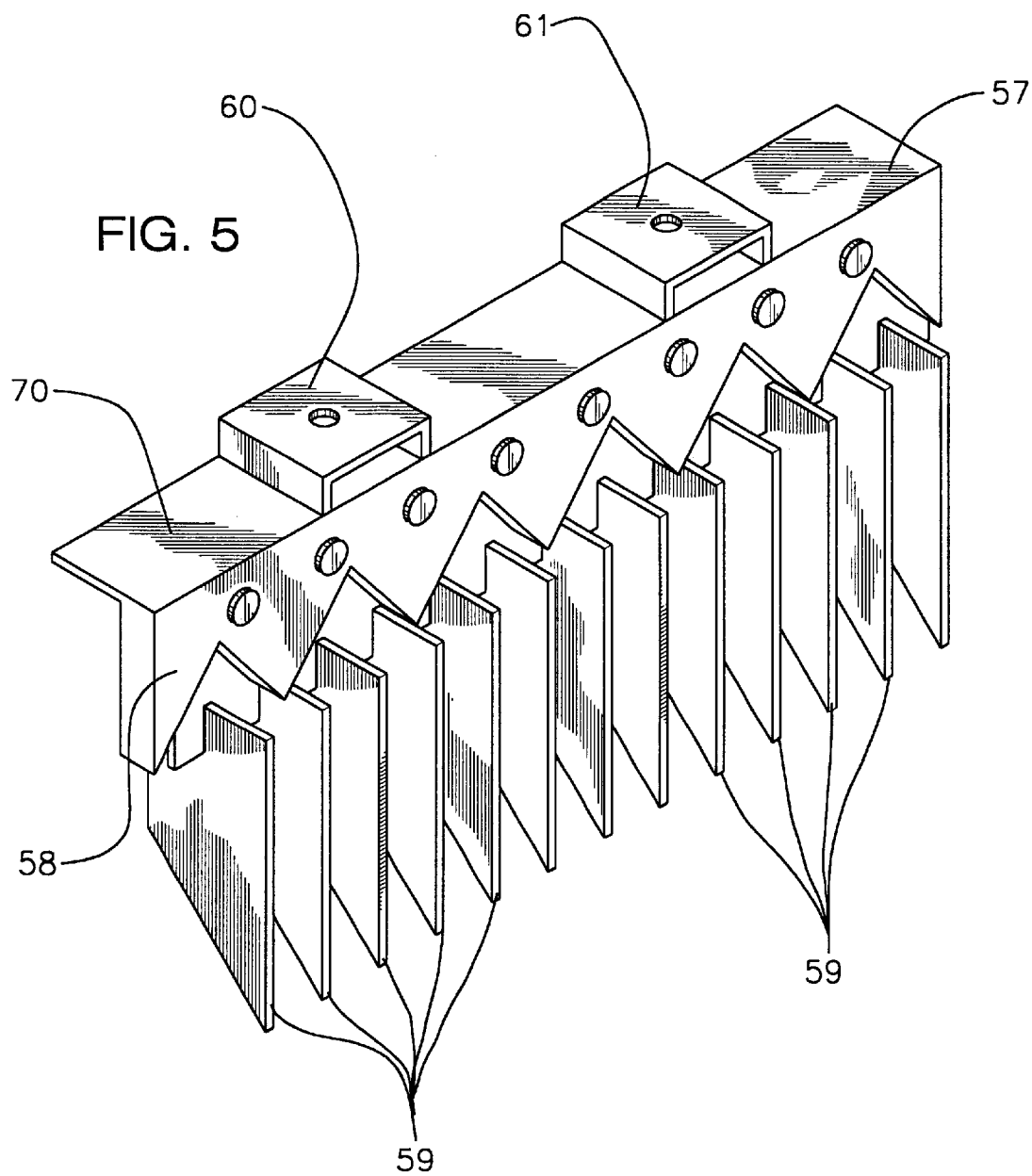
FIG. 5 is a perspective view of a rake member of a second embodiment of the present invention.
Figure 6:
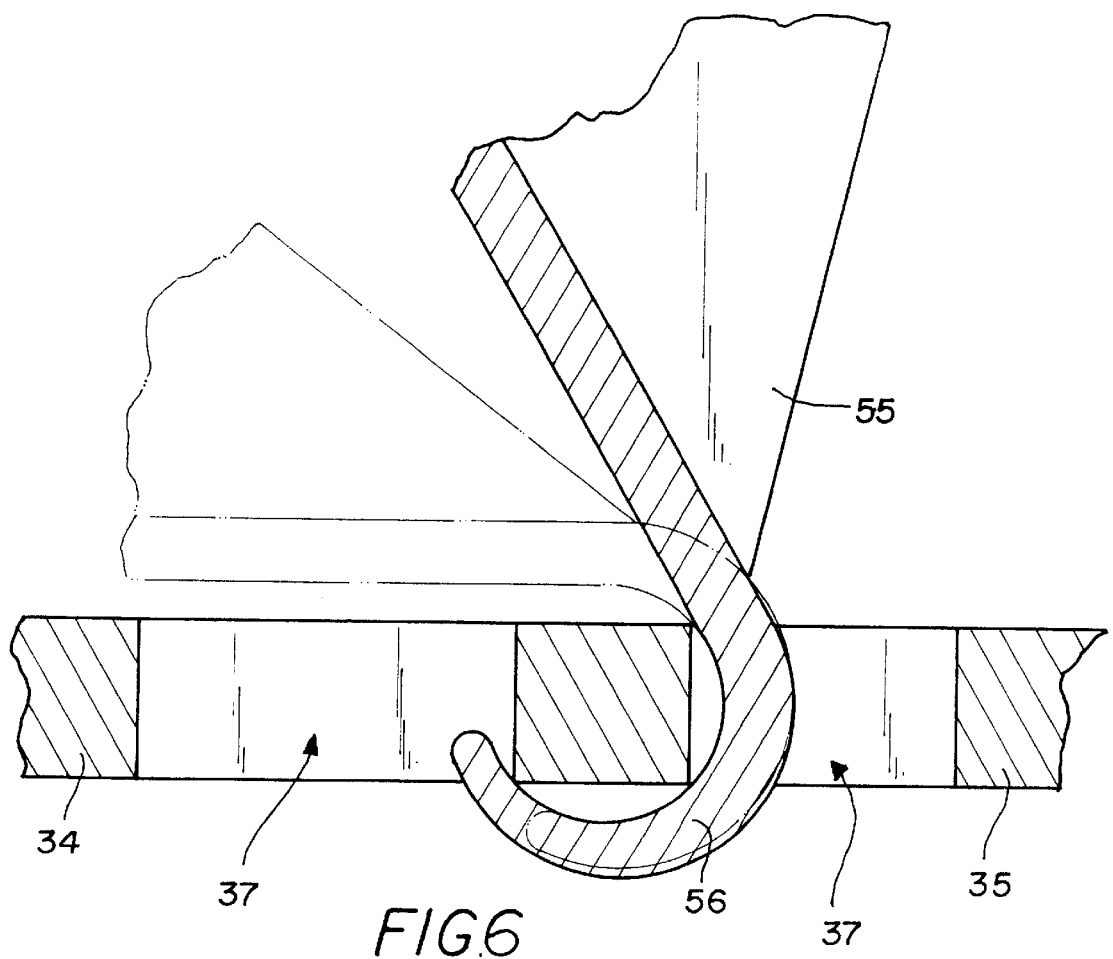
FIG. 6 is a detailed side elevational view of one of the hook-like retaining members of the present invention.

With reference now to the drawings, and in particular to FIGS. 1 through 6 thereof, a new interchangeable attachment assembly for a lawn tractor embodying the principles and concepts of the present invention and generally designated by the reference numeral 10 will be described.

As best illustrated in FIGS. 1 through 6, the interchangeable attachment assembly for a lawn tractor 10 generally comprises a base assembly 11 being adapted to mount to the lawn tractor 68. The base assembly 11 includes a base member 69, side walls 12,13 securely and conventionally mounted to ends of the base member 69, an elongate support member 14 being securely and conventionally attached to and extending between the side walls 12,13, and means for fastening the base assembly 11 to the lawn tractor 68 including spring-loaded pin-like members 15,16 being biasedly extended through the side walls 12,13, and also including bracket members 17 securely and conventionally mounted to the side walls 12,13 with the pin-like members 15, 16 being supported by the bracket members 17.

A lift means for lifting task-performing attachments includes a hydraulic ram 18 being pivotally and securely and conventionally attached with mounting brackets to the elongate support member 14 and to the base member 69 (see FIG. 1). The lift means also includes a lift attachment support member 19 having side walls 20,21 and a cross member 22 being securely attached to and extending between the side walls 20,21. The cross member 22 is mounted on a forward end of the base member 69 (see FIG. 2). The side walls 20,21 of the lift attachment support member 19 each have slots 23,24 extending in through a top edge thereof. The lift means further includes spring-loaded fastening members 25,26 being biasedly extended through the side walls 20,21 of the lift attachment support member 19.

Task-performing attachment means for performing various tasks and being mounted to the lift means comprises a fork lift attachment member 27 including a frame 28 having side walls 29,30 and cross members 31,32 securely and conventionally attached to the side walls 29,30, and also including fork members 34,39 being securely and conventionally attached to the frame 28, and further including an elongate fork lift support member 33 which extends through the side walls 29,30 of the fork lift attachment member 27 for mounting the fork lift attachment member 27 to the lift attachment support member 19, and also including winch support mounting members 44,45 securely attached to one of the cross members 31. The fastening members 25,26 are extendable through the side walls 29,30 of the frame 28 of the fork lift attachment member 27 with the elongate fork lift support member 33 being received in the slots 23,24 of the lift attachment support member 19. Each of the fork members 34,39 includes an elongate first portion 35,40 and an elongate second portion 36,41 which is angled relative to the elongate first portion 35,40 and which is securely attached to the frame 28 of the fork lift attachment member 27. Each of the elongate first portions 35,40 of the fork members 34,39 includes plurality of holes 37,42 being spaced apart and being disposed therethrough along an end portion thereof. The fork lift attachment member 27 includes pivot members 38,43 each being securely disposed in one of the holes 37,42 of a respective fork member 34,39.

As a first embodiment, the task-performing attachment means further includes a pair of tubular winch support members 46,47 being removably mounted about the winch support mounting members 44,45, and also includes a brace member 48 being securely and conventionally attached to the tubular winch support members 46,47, and further includes winch mounting brackets 49,50 being securely and conventionally attached to the tubular winch support members 46,47, and also includes a winch 51 being securely mounted to the winch mounting brackets 49,50 and having a cable 52, and further includes a pulley support member 53 securely and conventionally attached near outer ends of the tubular winch support members 46,47, and also includes a pulley 54 being mounted to the pulley support member 53 and being adapted to carry the cable 52. Each of the tubular winch support members 46,47 includes an elongate first portion and an elongate second portion which is angled relative to the elongate first portion. The winch mounting brackets 49,50 and the pulley support member 53 are securely and conventionally attached to the elongate second portions of the tubular winch support members 46,47. The task-performing attachment means further includes a bucket member 55 being pivotally mounted upon the fork members 34,39 and being connected to the cable 52, and also includes hook-like retaining members 56 each being securely attached to the bucket member 55 and being removably extended in one of the holes 37,42 of a respective fork member 34,39.

As a second embodiment, the task-performing attachment means also includes a rake attachment member 57 having an elongate rake support member 70, an elongate blade member 58 securely and conventionally attached to and extending along a length of the elongate rake support member 70, a plurality of tines 59 being spaced apart and extending along and from the elongate rake support member 70, and a plurality of mounting brackets 60,61 being attached to the elongate rake support member 70 and being adapted to receive the fork members 34,39 for fastenably attaching to the fork members 34,39.

As a third embodiment, the task-performing attachment means also includes a scraper attachment member 62 having a plate-like scraping member 63 having a first portion 64 and a second portion 65 being angled relative to the first portion 64, and also includes mounting brackets 66,67 securely and conventionally attached to the first portion 64 and being adapted to receive the fork members 34,39 for fastenably attaching to the fork members 34,39.

In use, the user mounts the base assembly 11 to the front end of a lawn tractor 68 and also attaches the hydraulic ram 18 and the lift attachment support member 19 to the base assembly 11 and further attaches the fork lift attachment member 27 to the lift attachment support member 19. The user can use the lawn tractor 68 to do various tasks with the various task-performing attachment means. It can be used to lift object with the fork members 34,39 and it can be used to carry objects in the bucket member 55 and it can be used as scraper and for raking.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Interchangeable attachment assembly for a lawn tractor comprising:
    a base assembly being adapted to mount to the lawn tractor,
    a lift assembly for lifting task-performing attachments, said lift assembly being mounted to said base assembly;
    a fork assembly removably mounted on said lift assembly; and
    a plurality of task-performing attachments for performing various tasks, each of said task-performing attachments being interchangeably and removably mountable on said fork assembly such that said task-performing attachments may be removed from said lift assembly with and without said fork assembly.

2. Interchangeable attachment assembly for a lawn tractor as described in claim 1, wherein said base assembly includes a base member, side walls mounted to ends of said base member, an elongate support member being attached to and extending between said side walls, and means for fastening said base assembly to the lawn tractor.

3. Interchangeable attachment assembly for a lawn tractor as described in claim 2, wherein said means for fastening said base assembly to the lawn tractor includes spring-loaded pin-like members being biasedly extended through said side walls, and also includes bracket members mounted to said side walls, said pin-like members being supported by said bracket members.

4. Interchangeable attachment assembly for a lawn tractor as described in claim 2, wherein said lift assembly includes a hydraulic ram being pivotally attached with mounting brackets to said elongate support member and to said base member, said lift assembly including a lift attachment support member having side walls and a cross member attached to and extending between said side walls, said lift attachment support member being mounted on a forward end of said base member.

5. Interchangeable attachment assembly for a lawn tractor as described in claim 4, wherein said side walls of said lift attachment support member each have slots extending in through a top edge thereof.

6. Interchangeable attachment assembly for a lawn tractor as described in claim 4 wherein said lift assembly includes spring-loaded fastening members being biasedly extended through said side walls of said lift attachment support member.

7. Interchangeable attachment assembly for a lawn tractor as described in claim 5, wherein said fork assembly includes a fork lift attachment member including a frame having side walls and cross members attached to said side walls, and also including fork members being attached to said frame, an elongate fork lift support member which extends through said side walls of said fork lift attachment member for mounting said fork lift attachment member to said lift attachment support member, and winch support mounting members attached to one of said cross members, fastening members being extendable through said side walls of the frame of said fork lift attachment member, said elongate fork lift support member being received in said slots of said lift attachment support member.

8. Interchangeable attachment assembly for a lawn tractor as described in claim 7, wherein each of said fork members includes an elongate first portion and an elongate second portion, said second portion being angled relative to said elongate first portion and being attached to said frame of said fork lift attachment member.

9. Interchangeable attachment assembly for a lawn tractor as described in claim 7, wherein each of said fork members includes a plurality of holes being spaced apart and being disposed therethrough along an end portion thereof.

10. Interchangeable attachment assembly for a lawn tractor as described in claim 9, wherein said fork lift attachment member includes pivot members each being disposed in one of said holes of a respective said fork member.

11. Interchangeable attachment assembly for a lawn tractor as described in claim 7, wherein said task-performing attachment means includes a pair of tubular winch support members being removably mounted about said winch support mounting members, a brace member being attached to said tubular winch support members, winch mounting brackets attached to said tubular winch support members, a winch mounted to said winch mounting brackets and having a cable, a pulley support member attached near outer ends of said tubular winch support members, and a pulley being mounted to said pulley support member and being adapted to carry said cable.

12. Interchangeable attachment assembly for a lawn tractor as described in claim 11, wherein each of said tubular winch support members includes an elongate first portion and an elongate second portion which is angled relative to said elongate first portion.

13. Interchangeable attachment assembly for a lawn tractor as described in claim 12, wherein said winch mounting brackets and said pulley support member are attached to said elongate second portions of said tubular winch support members.

14. Interchangeable attachment assembly for a lawn tractor as described in claim 11, wherein said plurality of task-performing attachment means further includes a bucket member being removably mounted upon said fork members, said cable being mounted on a rearward portion on said bucket member such that retraction of said cable raises the rearward portion of said bucket member with respect to said fork members and extension of said cable lowers the rearward portion of said bucket member with respect to said fork members, said bucket member including hook-shaped retaining members, each of said hook-shaped retaining members being mounted on a forward location of said bucket member, each of said hook-shaped retaining members being removably extended through one hole of a respective said fork member to pivotally connect said bucket member to said fork members in a manner permitting removal of said hook-shaped retaining members from said fork members.

15. Interchangeable attachment assembly for a lawn tractor as described in claim 10, wherein said plurality of task-performing attachment means also includes a rake attachment member having an elongate rake support member, an elongate blade member attached to and extending along a length of said elongate rake support member, a plurality of tines being spaced apart and extending along and from said elongate rake support member, and a plurality of mounting brackets being attached to said elongate rake support member and being adapted to receive a portion of said fork members for fastenably attaching to said fork members.

16. Interchangeable attachment assembly for a lawn tractor as described in claim 10, wherein said plurality of task-performing attachment means also includes a scraper attachment member having a plate-like scraping member having a first portion and a second portion being angled relative to said first portion, and also includes mounting brackets attached to said first portion and being adapted to receive said fork members for fastenably attaching to said fork members.

17. Interchangeable attachment assembly for a lawn tractor comprising:

a base assembly being adapted to mount to the lawn tractor;

a lift assembly for lifting task-performing attachments, said lift assembly being mounted to said base assembly;

a fork assembly removably mounted on said lift assembly; and a plurality of task-performing attachments for performing various tasks, each of said task-performing attachments being interchangeably and removably mountable on said fork assembly such that said task-performing attachments may be removed from said lift assembly with and without said fork assembly;

wherein said base assembly includes a base member, side walls mounted to ends of said base member, an elongate support member being attached to and extending between said side walls, and means for fastening said base assembly to the lawn tractor;

wherein said means for fastening said base assembly to the lawn tractor includes spring-loaded pin-like members being biasedly extended through said side walls, and also includes bracket members mounted to said side walls, said pin-like members being supported by said bracket members;

wherein said lift assembly includes a hydraulic ram being pivotally attached with mounting brackets to said elongate support member and to said base member, said lift assembly including a lift attachment support member having side walls and a cross member attached to and extending between said side walls, said lift attachment support member being mounted on a forward end of said base member;

wherein said side walls of said lift attachment support member each have slots extending in through a top edge thereof;

wherein said lift assembly includes spring-loaded fastening members being biasedly extended through said side walls of said lift attachment support member;

wherein said fork assembly includes a fork lift attachment member including a frame having side walls and cross members attached to said side walls, and also including fork members being attached to said frame, an elongate fork lift support member which extends through said side walls of said fork lift attachment member for mounting said fork lift attachment member to said lift attachment support member, and winch support mounting members attached to one of said cross members. said fastening members being extendable through said side walls of the frame of said fork lift attachment member, said elongate fork lift support member being received in said slots of said lift attachment support member;

wherein each of said fork members includes an elongate first portion and an elongate second portion, said second portion being angled relative to said elongate first portion and being attached to said frame of said fork lift attachment member;

wherein each of said fork members includes a plurality of holes being spaced apart and being disposed therethrough along an end portion thereof;

wherein said fork lift attachment member includes pivot members each being disposed in one of said holes of a respective said fork member;

wherein said task-performing attachment means includes a pair of tubular winch support members being removably mounted about said winch support mounting members, a brace member being attached to said tubular winch support members, winch mounting brackets attached to said tubular winch support members, a winch mounted to said winch mounting brackets and having a cable, a pulley support member attached near outer ends of said tubular winch support members, and a pulley being mounted to said pulley support member and being adapted to carry said cable;

wherein each of said tubular winch support members includes an elongate first portion and an elongate second portion which is angled relative to said elongate first portion;

wherein said winch mounting brackets and said pulley support member are attached to said elongate second portions of said tubular winch support members;

wherein said plurality of task-performing attachment means further includes a bucket member being removably mounted upon said fork members, said cable being mounted on a rearward portion on said bucket member such that retraction of said cable raises the rearward portion of said bucket member with respect to said fork members and extension of said cable lowers the rearward portion of said bucket member with respect to said fork members, said bucket member including hook-shaped retaining members. each of said hook-shaped retaining members being mounted on a forward location of said bucket member, each of said hook-shaped retaining members being removably extended through one of said holes of a respective said fork member to pivotally connect said bucket member to said fork members in a manner permitting removal of said hook-shaped retaining members from said fork members;

wherein said plurality of task-performing attachment means also includes a rake attachment member having an elongate rake support member, an elongate blade member attached to and extending along a length of said elongate rake support member, a plurality of tines being spaced apart and extending along and from said elongate rake support member, and a plurality of mounting brackets being attached to said elongate rake support member and being adapted to receive a portion of said fork members for fastenably attaching to said fork members; and wherein said plurality of task-performing attachment means also includes a scraper attachment member having a plate-like scraping member having a first portion and a second portion being angled relative to said first portion, and also includes mounting brackets attached to said first portion and being adapted to receive said fork members for fastenably attaching to said fork members.

18. Interchangeable attachment assembly for a lawn tractor comprising:

a fork assembly for removably mounting on a lawn tractor; and at least one task-performing attachment for performing various tasks, said at least one task-performing attachment being removably mounted on said fork assembly such that said at least one task-performing attachment may be removed from said fork assembly;

wherein said fork assembly includes a fork lift attachment member including a frame having side walls and cross members attached to said side walls, fork members having holes being attached to said frame;

wherein said plurality of task-performing attachment means further includes a bucket member being removably mounted upon said fork members said bucket member including hook-shaped retaining members, each of said hook-shaped retaining members being mounted on a forward location of said bucket member, each of said hook-shaped retaining members being removably extended through one of said holes of a respective said fork member to pivotally connect said bucket member to said fork members in a manner permitting removal of said hook-shaped retaining members from said fork members.

19. Interchangeable attachment assembly for a lawn tractor as described in claim 18, wherein said task-performing attachment means includes at least one winch support member being removably mounted on said frame of said fork assembly, a winch mounted on said at least one winch support member and having a cable rotatably mounted on said winch. a pulley support member mounted on said at least one winch support member, an end of said cable being mounted on a rearward portion on said bucket member such that retraction of said cable by said winch raises the rearward portion of said bucket member with respect to said fork members and extension of said cable by said winch lowers the rearward portion of said bucket member with respect to said fork members.

* * * * *